United States Patent
Suzuki et al.

(10) Patent No.: US 11,936,040 B2
(45) Date of Patent: Mar. 19, 2024

(54) ELECTROLYTIC MANGANESE DIOXIDE, METHOD FOR PRODUCING SAME, AND USE OF SAME

(71) Applicant: TOSOH CORPORATION, Yamaguchi (JP)

(72) Inventors: Naoto Suzuki, Yamaguchi (JP); Akinori Eshita, Yamaguchi (JP)

(73) Assignee: TOSOH CORPORATION, Yamaguchi (JP)

( * ) Notice: Subject to any disclaimer, the term of this patent is extended or adjusted under 35 U.S.C. 154(b) by 299 days.

(21) Appl. No.: 17/271,288

(22) PCT Filed: Aug. 23, 2019

(86) PCT No.: PCT/JP2019/033028
§ 371 (c)(1),
(2) Date: Feb. 25, 2021

(87) PCT Pub. No.: WO2020/045279
PCT Pub. Date: Mar. 5, 2020

(65) Prior Publication Data
US 2021/0336256 A1    Oct. 28, 2021

(30) Foreign Application Priority Data
Aug. 29, 2018 (JP) .................. 2018-160407

(51) Int. Cl.
*H01M 4/50* (2010.01)
*C01G 45/02* (2006.01)
(Continued)

(52) U.S. Cl.
CPC .............. *H01M 4/50* (2013.01); *C01G 45/02* (2013.01); *C25B 1/21* (2013.01); *C25B 15/02* (2013.01);
(Continued)

(58) Field of Classification Search
CPC ............. H01M 4/50; C01G 45/02; C25B 1/21
See application file for complete search history.

(56) References Cited

U.S. PATENT DOCUMENTS 10,033,038 B2 * 7/2018 Suetsugu ................ H01M 4/50
10,109,858 B1 * 10/2018 Jegaden ................... H01M 4/62
(Continued)

FOREIGN PATENT DOCUMENTS

EP      1 184 919 A2   3/2002
JP      2013-177293 A   9/2013
(Continued)

OTHER PUBLICATIONS

Machine translation of JP 2013-177293 (no date).*
(Continued)

*Primary Examiner* — Amanda C. Walke
(74) *Attorney, Agent, or Firm* — GREENBLUM & BERNSTEIN, P.L.C.

(57) ABSTRACT

To provide electrolytic manganese dioxide excellent in low rate characteristics and middle rate characteristics when used as a cathode material for alkaline manganese dry cells, and a method for its production.
Electrolytic manganese dioxide of which the apparent density is at least 4.0 g/cm³ and at most 4.3 g/cm³, and the mode particle size is at least 30 μm and at most 100 μm; a method for its production and its application.

9 Claims, 3 Drawing Sheets

(51) Int. Cl.
    *C25B 1/21*    (2006.01)
    *C25B 15/02*   (2021.01)
    *H01M 10/24*   (2006.01)
    *H01M 4/02*    (2006.01)

(52) U.S. Cl.
    CPC ......... *H01M 10/24* (2013.01); *C01P 2004/51* (2013.01); *C01P 2006/10* (2013.01); *C01P 2006/14* (2013.01); *C01P 2006/40* (2013.01); *H01M 2004/021* (2013.01); *H01M 2004/028* (2013.01)

(56) References Cited

U.S. PATENT DOCUMENTS

| | | | |
|---|---|---|---|
| 2015/0298989 A1* | 10/2015 | Xu | B02C 23/36 241/24.1 |
| 2019/0119124 A1 | 4/2019 | Miura et al. | |

FOREIGN PATENT DOCUMENTS

| | | |
|---|---|---|
| JP | 6115174 B2 | 4/2017 |
| JP | 2017-179583 A | 10/2017 |
| JP | 2018-076222 A | 5/2018 |
| WO | 00/37714 A1 | 6/2000 |
| WO | 02/066707 A2 | 8/2002 |
| WO | 2013/115335 A1 | 8/2013 |
| WO | 2015/093578 A1 | 6/2015 |

OTHER PUBLICATIONS

Machine translation of JP 2018-076222 (no date).*
International Search Report issued in International Patent Application No. PCT/JP2019/033028, dated Nov. 19, 2019, along with English Translation thereof.
Written Opinion of the International Searching Authority issued in International Patent Application No. PCT/JP2019/033028, dated Nov. 19, 2019, along with English Translation thereof.

* cited by examiner

ELECTROLYTIC MANGANESE DIOXIDE, METHOD FOR PRODUCING SAME, AND USE OF SAME

TECHNICAL FIELD

The present invention relates to electrolytic manganese dioxide and a method for its production, and its application. More particularly, it relates to electrolytic manganese dioxide to be used as a cathode active material for e.g. manganese dry cells, particularly alkaline manganese dry cells, and a method for its production.

BACKGROUND ART

Manganese dioxide is known as a cathode active material for e.g. manganese dry cells, particularly, alkaline manganese dry cells, and has such merits that it is excellent in storage stability and is inexpensive. In particular, alkaline manganese dry cells using electrolytic manganese dioxide as the cathode active material are excellent in the discharge characteristics in a wide range of load, that is low rate discharge, middle rate discharge and high rate discharge, and thus are widely used in electronic cameras, portable information devices, and further game machines and toys, and further improvement in performance for low rate and middle rate application has been desired in recent years.

In order to improve the cell performance of an alkaline manganese dry cell, particularly low rate discharge performance and middle rate discharge performance, it is effective to increase the packing density of a cathode mixture (a mixture of manganese dioxide, graphite and electrolyte) in the dry cell. By increasing the packing density of the cathode mixture, the amount of manganese dioxide in the dry cell can be increased and as a result, the low rate discharge performance and the middle rate discharge performance are likely to improve.

Heretofore, by increasing the packing density of the cathode mixture in the dry cell, electrolytic manganese dioxide characterized in that the pore volume of mesopores having a diameter of from 2 to 50 nm is at most 0.004 cm$^3$/g has been proposed (Patent Document 1).

Further, electrolytic manganese oxide characterized in that the apparent particle density is at least 3.0 g/cm$^3$, the particle density is at least 4.25 g/cm$^3$, and the open pore is at least 0.01 mL/g has been proposed (Patent Document 2).

PRIOR ART DOCUMENTS

Patent Documents

Patent Document 1: Japanese Patent No. 6115174
Patent Document 2: JP-A-2013-177293

DISCLOSURE OF INVENTION

Technical Problem

Even with the electrolytic manganese dioxides disclosed in Patent Documents 1 and 2, the packing density of the cathode mixture is not sufficient, and electrolytic manganese dioxide capable of further increasing the packing density of the cathode mixture has been desired.

It is an object of the present invention to provide electrolytic manganese dioxide which achieves a high packing density of the cathode mixture and is useful as a cathode active material for a manganese dry cell and an alkaline manganese dry cell excellent in cell performance particularly low rate discharge performance and middle rate discharge performance, and is different from conventional ones in that the apparent density is high and the mode particle size is large, a method for its production and its application.

Solution to Problem

The present inventors have conducted extensive studies on electrolytic manganese dioxide to be used as a cathode active material for a manganese dry cell, particularly an alkaline manganese dry cell, and as a result, have found that by electrolytic manganese dioxide having such features that the apparent density is at least 4.0 g/cm$^3$ and at most 4.3 g/cm$^3$, and the mode particle size is at least 30 μm and at most 100 μm, it becomes to be a cathode material which achieves a high packing density of the cathode mixture and which is excellent in the cell performance particularly the low rate discharge performance and the middle rate discharge performance, and thus have accomplished the present invention.

That is, the present invention resides in the following [1] to [9].

[1] Electrolytic manganese dioxide, characterized in that the apparent density is at least 4.0 g/cm$^3$ and at most 4.3 g/cm$^3$, and the mode particle size is at least 30 μm and at most 100 μm.

[2] The electrolytic manganese dioxide according to the above [1], characterized in that the micropore volume is at most 0.009 mL/g.

[3] The electrolytic manganese dioxide according to the above [1] or [2], characterized in that the maximum particle size is at most 500 μm.

[4] The electrolytic manganese dioxide according to any one of the above [1] to [3], characterized in that the alkali potential is at least 280 mV and at most 350 mV.

[5] The electrolytic manganese dioxide according to any one of the above [1] to [4], characterized in that the sulfate group (SO$_4$) content is at most 1.5 wt %.

[6] The electrolytic manganese dioxide according to any one of the above [1] to [5], characterized in that the sodium content is at least 10 wt ppm and at most 5,000 wt ppm.

[7] A method for producing the electrolytic manganese dioxide as defined in any one of the above [1] to [6], characterized in that the sulfuric acid concentration in the electrolyte at the time of electrolysis is at least 42 g/L and at most 50 g/L, the sulfuric acid concentration from the initiation of electrolysis to the completion of electrolysis is constant, the manganese/sulfuric acid concentration ratio in the electrolyte at the time of electrolysis is at least 0.1 and at most 0.6, and the electrolysis current density is at least 0.1 A/dm$^2$ and at most 0.5 A/dm$^2$.

[8] A cathode active material for a dry cell, characterized by comprising the electrolytic manganese dioxide as defined in any one of the above [1] to [6].

[9] A dry cell characterized by comprising the cathode active material for a dry cell as defined in the above [8].

Advantageous Effects of Invention

The electrolytic manganese dioxide of the present invention achieves a high packing density of the cathode mixture and excellent cell performance particularly low rate discharge performance and middle rate discharge performance when used as a cathode material of an alkaline dry cell, and further, according to the production method of the present invention, electrolytic manganese dioxide of the present invention can be obtained.

DESCRIPTION OF EMBODIMENTS

Hereinafter, the present invention will be described in more detail.

The electrolytic manganese dioxide of the present invention is such that the apparent density is at least 4.0 g/cm$^3$ and at most 4.3 g/cm$^3$. If the apparent density is lower than 4.0 g/cm$^3$, the packing density of the cathode mixture in the dry cell tends to be low, and as a result, the cell performance particularly low rate performance and middle rate performance tend to be low. If the apparent density is higher than 4.3 g/cm$^3$, although the packing density of the cathode mixture in the dry cell tends to be high, pores in the electrolytic manganese dioxide particles tend to be too small, whereby the electrolyte which can be retained in the electrolytic manganese dioxide particles is small, and as a result, the cell performance particularly high rate performance tends to decrease. In order to increase low rate performance, middle rate performance and high rate performance, the apparent density is preferably at least 4.0 g/cm$^3$ and at most 4.2 g/cm$^3$.

The apparent density in the present invention is the density based on the volume of particles assuming that closed pores which are closed in the electrolytic manganese dioxide particles and into which gas cannot infiltrate, and open pores which are open to the surface of the electrolytic manganese dioxide particles and into which gas can infiltrate, are part of the particles. The apparent density can be obtained by the method disclosed in the after-mentioned Examples.

The electrolytic manganese dioxide of the present invention is such that the mode particle size is at least 30 μm and at most 100 μm. if the mode particle size is less than 30 μm, the packing density of the cathode mixture in the dry cell tends to be low and as a result, the cell performance particularly low rate performance and middle rate performance tend to be low. If the mode particle size is larger than 100 μm, the cell performance particularly high rate performance tends to be low. In order to increase low rate performance, middle rate performance and high rate performance, the mode particle size is preferably at least 30 μm and at most 70 μm, more preferably at least 40 μm and at most 70 μm.

The electrolytic manganese dioxide of the present invention is such that to increase the packing density of the cathode mixture, the micropore volume is preferably at most 0.009 mL/g, more preferably at most 0.008 mL/g.

The electrolytic manganese dioxide of the present invention is such that to increase the packing density of the cathode mixture, the micropore area is preferably at most 70 m$^2$/g, more preferably at most 60 m$^2$/g.

The electrolytic manganese dioxide of the present invention is such that to increase the high rate performance, the maximum particle size is preferably at most 500 μm, more preferably at most 400 μm, further preferably at most 350 μm.

The electrolytic manganese dioxide of the present invention is such that to keep a high voltage, to lengthen the discharge time until the available discharge voltage lower limit, and to improve the cell performance when used for an alkaline manganese dry cell, the alkali potential is preferably at least 280 mV and at most 350 mV, more preferably at least 280 mV and at most 340 my, further preferably at least 290 mV and at most 340 mV. The alkali potential is measured in a 40 wt % KOH aqueous solution by using a mercury/mercury oxide reference electrode as the standard.

The electrolytic manganese dioxide of the present invention is such that to achieve more excellent high rate performance and to keep high retention of a dry cell when used for an alkaline manganese dry cell, the sulfate group ($SO_4$) content is preferably at most 1.5 wt %, more preferably at most 1.3 wt %.

The electrolytic manganese dioxide of the present invention is such that to suppress corrosion of a metal material such as a can and to maintain high rate performance when used for an alkaline manganese dry cell, the sodium content is preferably at least 10 wt ppm and at most 5,000 wt ppm, more preferably at least 10 wt ppm and at most 3,000 wt ppm. Sodium contained in the electrolytic manganese dioxide is derived mainly from sodium hydroxide used as a neutralizing agent.

The electrolytic manganese dioxide of the present invention is such that to keep high rate performance of a dry cell to be high and to maintain the packing density of the cathode mixture in the dry cell to be high, the BET specific surface area is preferably at least 20 m$^2$/g and at most 30 m$^2$/g, more preferably at least 24 m$^2$/g and at most 27 m$^2$/g.

The electrolytic manganese dioxide of the present invention is such that to readily improve the high rate/middle rate/low rate performance when used for an alkaline manganese dry cell, the average particle size is preferably at least 20 μm and at most 80 μm, more preferably at least 30 μm and at most 70 μm.

Now, the method for producing electrolytic manganese dioxide of the present invention will be described.

In the method for producing electrolytic manganese dioxide of the present invention, the sulfuric acid concentration in the electrolyte at the time of electrolysis is at least 42 g/L and at most 50 g/L, the sulfuric acid concentration from the initiation of electrolysis to the completion of electrolysis is constant. By adjusting the sulfuric acid concentration in the electrolyte at the time of electrolysis to be at least 42 g/L and at most 50 g/L and making the sulfuric acid concentration from the initiation of electrolysis to the completion of electrolysis to be constant, electrolytic manganese dioxide such that the apparent density is at least 4.0 g/cm$^3$ and at most 4.3 g/cm$^3$ can be produced.

As the electrolyte in the electrolytic cell, a sulfuric acid-manganese sulfate mixed solution is used. Here, the sulfuric acid concentration is a value excluding sulfate ions of manganese sulfate.

In the method for producing electrolytic manganese dioxide of the present invention, the manganese/sulfuric acid concentration ratio in the electrolyte at the time of electrolysis is at least 0.1 and at most 0.6. If the manganese/sulfuric acid concentration ratio is less than 0.1, the sulfuric acid concentration in the electrolyte tends to be too high, or the feed manganese concentration tends to be low, and the production efficiency will extremely be low. On the contrary, if the manganese/sulfuric acid concentration ratio is higher than 0.6, the alkali potential of the electrolytic manganese dioxide tends to be low.

In the method for producing electrolytic manganese dioxide of the present invention, the electrolysis current density is at least 0.1 A/dm$^2$ and at most 0.5 A/dm$^2$. If the electrolysis current density is less than 0.1 A/dm$^2$, the productivity will extremely be low. On the contrary, if it is higher than 0.5 A/dm$^2$, the apparent density tends to be low. From the viewpoint of the productivity and the apparent density, the electrolysis current density is preferably at least 0.2 A/dm² and at most 0.4 A/dm².

The electrolysis temperature is preferably at least 90° C. and at most 99° C., to maintain the current efficiency thereby to maintain the production efficiency, to suppress evaporation of the electrolyte thereby to prevent the heating cost increase, and to increase the apparent density of the electrolytic manganese dioxide particles. The electrolysis temperature is more preferably at least 93° C. and at most 97° C., further preferably at least 95° C. and at most 97° C., from the viewpoint of the current efficiency, the heating cost and the apparent density.

The method for producing electrolytic manganese dioxide of the present invention is to mill the electrolytic manganese dioxide obtained by the electrolysis. For the milling, for example, a roller mill, a jet mill, etc. may be used. The roller mill may, for example, be a centrifugal roller mill, a vertical type Loesche mill, etc. Among roller mills, in view of excellency in cost and durability and being suitable for industrial use, preferred is a roller mill which is capable of milling a raw material having such a hardness that the micro Vickers hardness is at least 400 HV (JIS Z2244), and which has a mill motor of at least 20 kW and at most 150 kW.

There is no particular limitation as to the method of using the electrolytic manganese dioxide of the present invention as a cathode active material for an alkaline manganese dry cell, and by a known method, it may be mixed with additives and used as a cathode mixture. For example, to the electrolytic manganese dioxide (cathode active material), graphite for imparting conductivity, an electrolyte, etc. may be added to prepare a mixed powder, which may be press-molded in a disc-shape or ring-shape to obtain a powder molded body which is useful as a cathode mixture. The cathode mixture, a negative electrode, a negative electrode current collector, a separator and an electrolyte are put in a cathode can, which is sealed to obtain a cell (dry cell).

EXAMPLES

Figure 1:
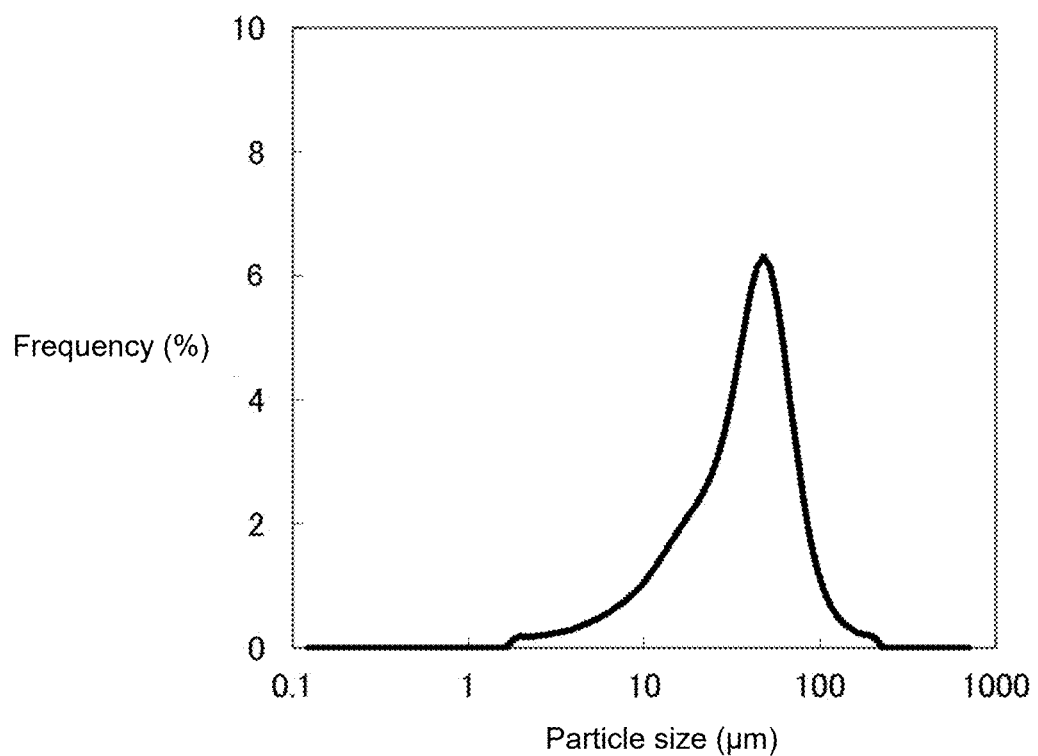
FIG. 1 illustrates particle size distribution of electrolytic manganese dioxide obtained in Example 1.

Now, the present invention will be described in further detail with reference to Examples and Comparative Examples, but the present invention is by no means limited by these Examples.

<Measurement of Apparent Density, Particle Density, Open Pore Volume, Micropore Volume and Micropore Area>

The apparent density of electrolytic manganese dioxide was measured as follows.

First, the particle density of electrolytic manganese dioxide was measured using a dry automatic densimeter (AccuPyc II 1340, trade name, manufactured by Shimadzu Corporation) with helium. From the inverse of the obtained particle density, the sum of the net volume of electrolytic manganese dioxide solid and the volume of closed pores into which gas cannot infiltrate was obtained.

Then, the volume of open pores (pore size: 0.4 to 100 nm) which are open to the surface of the electrolytic manganese dioxide particles and into which gas can infiltrate, was measured by high precision multi-sample gas adsorption amount measuring apparatus (Autosorb-iQ, trade name, manufactured by Anton Paar). The electrolytic manganese dioxide particles were dehydrated at 150° C. for 4 hours while being evacuated of air, and then using argon as the adsorbent, the argon adsorption amount was measured at 87 K within a pressure range of from 0.0001 to 760 Torr, and the argon adsorption amount was taken as the volume of open pores. Further, NLDFT was applied to the obtained adsorption isotherm to calculate the pore distribution, and the pore volume and the pore area of pores within a range of from 0.46 to 1.95 nm were respectively taken as the micropore volume and the micropore area. In NLDFT, fitting was conducted using a zeolite/silica cylindrical pore model. When the volume of open pores was measured, in order to exclude the volume of pores among the electrolytic manganese dioxide particles, particles of 5 μm or smaller were removed by wet classification and the particle size was adjusted to be form 5 to 200 μm.

The apparent density (g/cm³) of electrolytic manganese dioxide was obtained from the following formula.

1/(the net volume of electrolytic manganese dioxide solid +the volume of closed pores into which gas cannot infiltrate +the volume of open pores into which gas can infiltrate)

<Measurement of Cathode Mixture Density (Packing Density)>

The cathode mixture density was measured as follows.

65 g of electrolytic manganese dioxide, 2.9 g of graphite and 5.1 g of a 37 wt % aqueous potassium hydroxide solution were mixed by a V mixer (VM-2, trade name, manufactured by TSUTSUI SCIENTIFIC INSTRUMENTS. CO., LTD.) for 20 minutes, calendered by a roller compactor under a pressure of 30 MPa, and further classified by a sieve into 180 μm to 1 mm to obtain cathode mixture granules. 3.5 g of the cathode mixture granules were pressurized by a mold having an outer diameter of 13 mm and an inner diameter of 9 mm under 2.7 t/cm² to prepare a ring-shaped molded product, and the density of the molded product was obtained from the weight and the volume. 18 Such ring-shaped molded products were prepared and their densities were measured, and the average was taken as the cathode mixture density.

<Measurement of Alkali Potential>

The alkali potential of electrolytic manganese dioxide was measured in a 40 wt % aqueous KOH solution as follows.

To 3 g of the electrolytic manganese dioxide, 0.9 g of graphite as a conductive agent was added to obtain a mixed powder, and 4 ml of a 40 wt % aqueous KOH solution was added to this mixed powder, to obtain a mixture slurry of the electrolytic manganese dioxide, carbon and the aqueous KOH solution. The potential of the mixture slurry was measured, based on the mercury/mercury oxide reference electrode, and the obtained value was taken as the alkali potential of the electrolytic manganese dioxide.

<Measurement of Sulfate Group and Sodium Contents>

The sulfate group and sodium contents in the electrolytic manganese dioxide were quantitatively measured by dissolving the electrolytic manganese dioxide in nitric acid and hydrogen peroxide and measuring the obtained solution by ICP.

<Measurement of Mode Particle Size, Average Particle Size and Maximum Particle Size>

The mode particle size, the average particle size (50% size) and the maximum particle size of the electrolytic manganese dioxide were measured by a particle size distribution measuring apparatus (Microtrac MT3300EXII, trade name, manufactured by MicrotracBEL Corp.) at HRA mode. No dispersion treatment such as ultrasonic dispersion was conducted at the time of measurement.

<Measurement of BET Specific Surface Area>

The BET specific surface area of the electrolytic manganese dioxide was measured by nitrogen adsorption by a BET one point method. As the measuring apparatus, a gas adsorption specific surface area measuring apparatus (Flow Sorb III, trade name, manufactured by Shimadzu Corporation) was used. Prior to the measurement, the electrolytic manganese dioxide was dehydrated by heating at 150° C. for 1 hour.

Example 1

Electrolysis was conducted by using an electrolytic cell which has a heating device, and a titanium plate as an anode and a graphite plate as a cathode, which are suspended so as to face each other.

By supplying a manganese sulfate feed solution with a manganese ion concentration of 35 g/L to the electrolytic cell, maintaining the electrolysis current density to be 0.34 A/dm$^2$ and the temperature of the electrolytic cell to be 97° C., and adjusting the sulfuric acid concentration to be 43 g/L and the manganese/sulfuric acid concentration ratio to be 0.34, electrolysis was conducted for 15 days.

Figure 2:
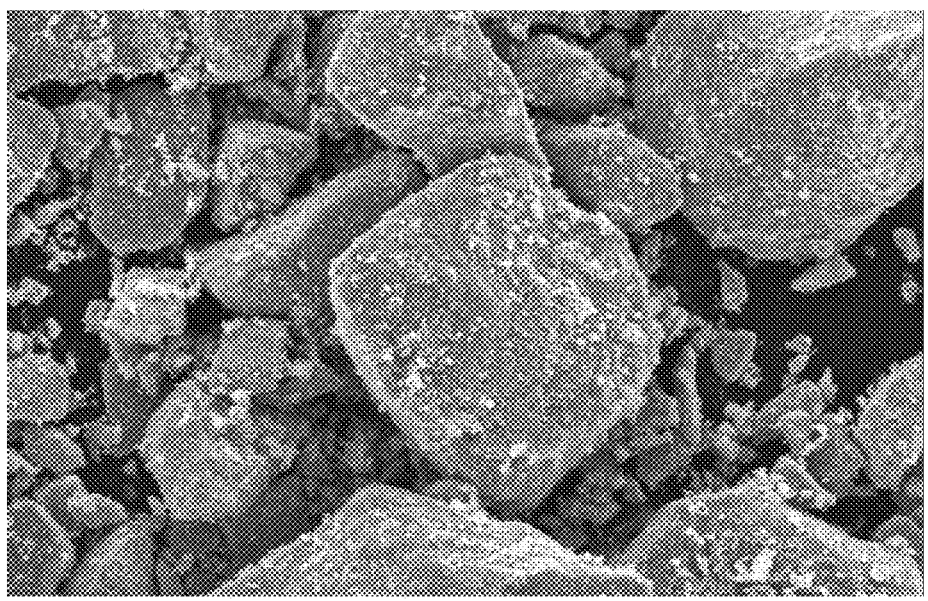
FIG. 2 is an electron microscopic photograph of electrolytic manganese dioxide obtained in Example 1.

After the electrolysis, the electrodeposited plate-shaped electrolytic manganese dioxide was washed with pure water and then milled to obtain a milled product of the electrolytic manganese dioxide. Then, this electrolytic manganese dioxide milled product was put in a water bath and stirred, and an aqueous sodium hydroxide solution was added, to conduct a neutralization treatment so as to bring the pH of the slurry to be 2.8. Then, the electrolytic manganese dioxide was washed with water, filtered for separation and dried, and subjected to a sieve with an opening of 63 μm to obtain an electrolytic manganese dioxide powder. Of the obtained electrolytic manganese dioxide powder, the particle size distribution is shown in FIG. 1, the electron microscopic photograph is shown in FIG. 2, and the results of evaluation of the mode particle size, the average particle size, the cathode mixture density, the alkali potential, the BET specific surface area, and the sulfate group and sodium contents are shown in Table 1.

Figure 3:
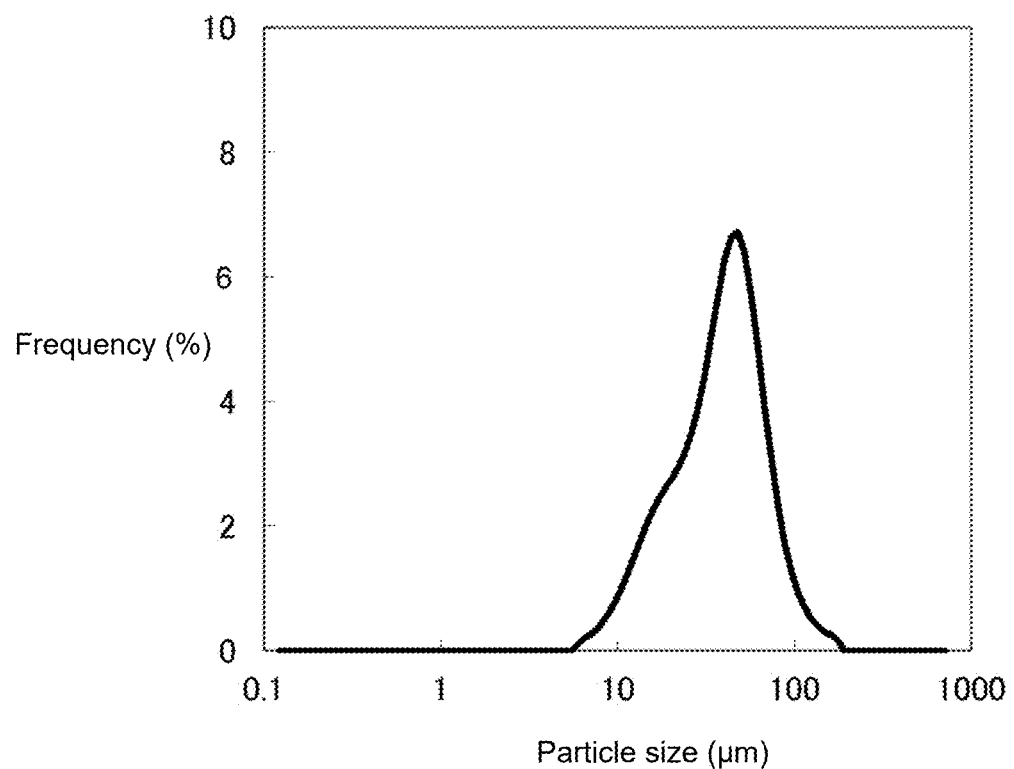
FIG. 3 illustrates particle size distribution of electrolytic manganese dioxide obtained in Example 1 having particles of 5 μm or smaller removed.
Figure 4:
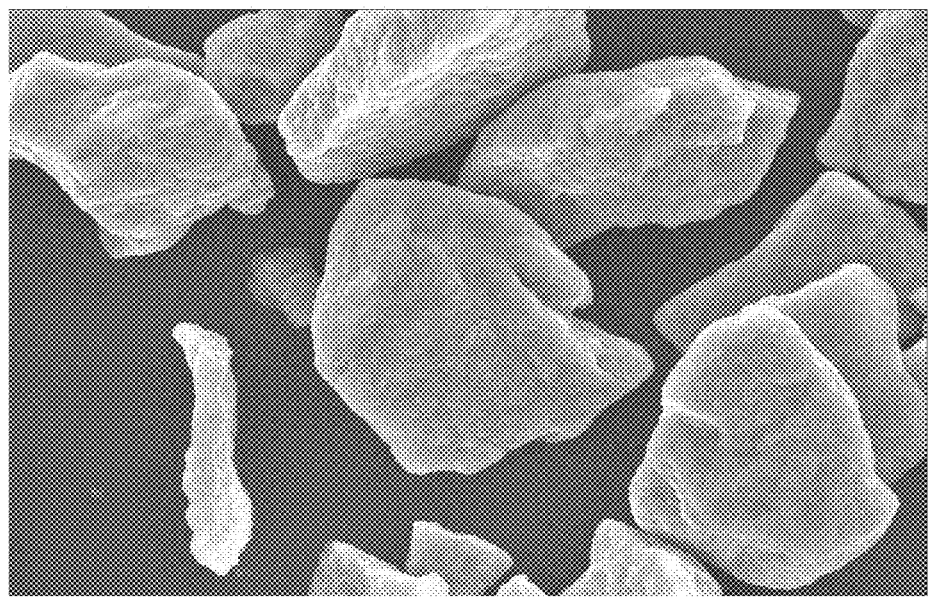
FIG. 4 is an electron microscopic photograph of electrolytic manganese dioxide obtained in Example 1 having particles of 5 μm or smaller removed.
Figure 5:
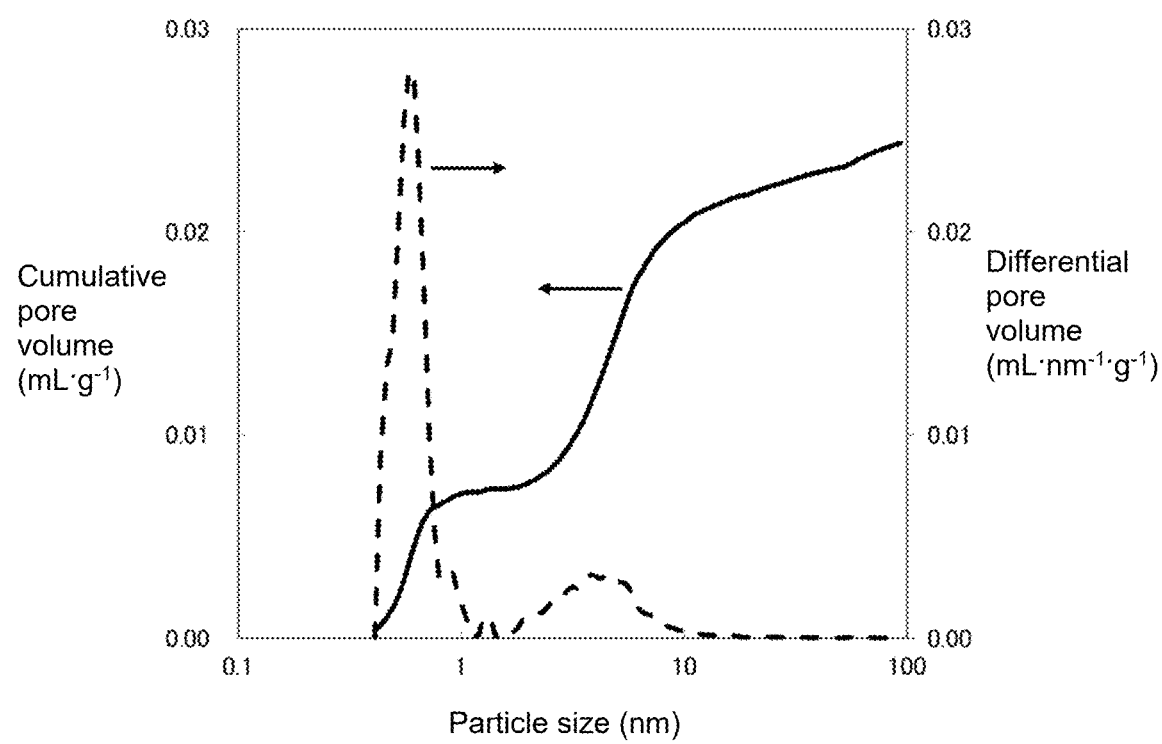
FIG. 5 illustrates pore size distribution of electrolytic manganese dioxide obtained in Example 1 having particles of 5 μm or smaller removed.

Further, from the obtained electrolytic manganese dioxide powder, particles of 5 μm or smaller were removed as follows. First, pure water was added to the electrolytic manganese dioxide powder to prepare a slurry, to which aqueous ammonia was added to adjust the pH to be 8.5. Then, the slurry was subjected to ultrasonic dispersion and left at rest for 1 hour, and the supernatant liquid containing particles of 5 μm or smaller in a large amount was removed by decantation. Pure water was added to the obtained residue to prepare a slurry, and the same operation to remove particles of 5 μm or smaller was repeatedly carried out 5 times, and the obtained residue was dried at 60° C. to obtain an electrolytic manganese dioxide powder having particles of 5 μm or smaller removed. Of the obtained electrolytic manganese dioxide powder having particles of 5 μm or smaller removed, the particle size distribution is shown in FIG. 3, the electron microscopic photograph is shown in FIG. 4, the pore size distribution is shown in FIG. 5, and the results of evaluation of the particle density, the open pore volume, the apparent density, the micropore volume, etc. are shown in Table 1.

TABLE 1

| | Apparent density (g/cm$^3$) | Particle density (g/cm$^3$) | Open pore volume (cm$^3$/g) | Micropore volume (mL/g) | Micropore area (m$^2$/g) | Mode particle size (μm) | Maximum particle size (μm) | Average particle size (μm) | Cathode mixture density (g/cm$^3$) | Alkali potential (mV) | BET specific surface area (m$^2$/g) | SO$_4$ (wt %) | Na (wtppm) |
|---|---|---|---|---|---|---|---|---|---|---|---|---|---|
| Ex. 1 | 4.11 | 4.48 | 0.0198 | 0.0077 | 50.6 | 48.0 | 148.0 | 37.6 | 3.42 | 312 | 24.0 | 1.05 | 430 |
| Ex. 2 | 4.08 | 4.48 | 0.0216 | 0.0067 | 44.0 | 40.4 | 209.3 | 25.5 | 3.44 | 286 | 24.3 | 1.25 | 1300 |
| Ex. 3 | 4.01 | 4.47 | 0.0254 | 0.0088 | 58.3 | 44.0 | 148.0 | 32.2 | 3.37 | 296 | 29.3 | 1.13 | 2280 |
| Ex. 4 | 4.08 | 4.48 | 0.0217 | 0.0074 | 49.2 | 44.0 | 176.0 | 31.5 | 3.43 | 296 | 24.3 | 1.15 | 2340 |
| Ex. 5 | 4.05 | 4.48 | 0.0239 | 0.0082 | 54.2 | 40.4 | 148.0 | 32.6 | 3.36 | 312 | 26.3 | 1.20 | 1340 |
| Ex. 6 | 4.05 | 4.48 | 0.0239 | 0.0082 | 54.2 | 48.0 | 176.0 | 39.4 | 3.39 | 312 | 26.3 | 1.20 | 1200 |
| Ex. 7 | 4.05 | 4.48 | 0.0239 | 0.0082 | 54.2 | 57.9 | 248.9 | 52.9 | 3.43 | 312 | 26.3 | 1.20 | 1200 |
| Comp. Ex. 1 | 3.92 | 4.49 | 0.0323 | 0.0108 | 70.7 | 40.4 | 148.0 | 33.1 | 3.32 | 315 | 35.6 | 1.16 | 450 |
| Comp. Ex. 2 | 3.88 | 4.48 | 0.0345 | 0.0158 | 94.0 | 28.5 | 169.4 | 24.1 | 3.27 | 317 | 38.0 | 1.10 | 1100 |
| Comp. Ex. 3 | 3.78 | 4.48 | 0.0411 | 0.0186 | 110.5 | 40.4 | 148.0 | 34.1 | 3.23 | 318 | 45.0 | 1.08 | 1010 |

Example 2

Electrolysis was conducted in the same manner as in Example 1 except that a manganese sulfate feed solution with a manganese ion concentration of 45 g/L was supplied, that the sulfuric acid concentration was 46 g/L, that the manganese/sulfuric acid concentration ratio was 0.50, and that the pH at the time of the neutralization treatment was 4.2. Of the obtained electrolytic manganese dioxide, the results of evaluation of the apparent density, the mode particle size, etc. are shown in Table 1.

Example 3

Electrolysis was conducted in the same manner as in Example 2 except that the electrolysis current density was 0.50 A/dm$^2$, that the temperature of the electrolytic cell was kept at 96° C., and that the pH at the time of the neutralization treatment was 5.6. Of the obtained electrolytic manganese dioxide, the results of evaluation of the apparent density, the mode particle size, etc. are shown in Table 1.

Example 4

Electrolysis was conducted in the same manner as in Example 2 except that the sulfuric acid concentration was 45 g/L, that the temperature of the electrolytic cell was kept at 96° C., and that the pH at the time of the neutralization treatment was 5.6. Of the obtained electrolytic manganese dioxide, the results of evaluation of the apparent density, the mode particle size, etc. are shown in Table 1.

Example 5

Electrolysis was conducted in the same manner as in Example 1 except that the sulfuric acid concentration was 42 g/L, that the manganese/sulfuric acid concentration ratio was 0.38, that the electrolysis current density was 0.40 A/dm$^2$, that the temperature of the electrolytic cell was kept at 96° C., and that the pH at the time of the neutralization treatment was 4.2. Of the obtained electrolytic manganese dioxide, the results of evaluation of the apparent density, the mode particle size, etc. are shown in Table 1.

Example 6

Electrolysis was conducted in the same manner as in Example 5 except that after electrolysis, neutralization treatment, washing with water, filtration for separation and drying were conducted, the electrolytic manganese dioxide was subjected to a sieve with an opening of 75 μm. Of the obtained electrolytic manganese dioxide, the results of evaluation of the apparent density, the mode particle size, etc. are shown in Table 1.

Example 7

Electrolysis was conducted in the same manner as in Example 5 except that after electrolysis, neutralization treatment, washing with water, filtration for separation and drying were conducted, the electrolytic manganese dioxide was subjected to a sieve with an opening of 90 μm. Of the obtained electrolytic manganese dioxide, the results of evaluation of the apparent density, the mode particle size, etc. are shown in Table 1.

Comparative Example 1

Electrolysis was conducted in the same manner as in Example 2 except that the sulfuric acid concentration was 45 g/L, that the electrolysis current density was 0.55 A/dm$^2$, that the temperature of the electrolytic cell was kept at 96° C., and that the pH at the time of the neutralization treatment was 2.8. Of the obtained electrolytic manganese dioxide, the results of evaluation of the apparent density, the mode particle size, etc. are shown in Table 1.

Comparative Example 2

Electrolysis was conducted in the same manner as in Example 3 except that the sulfuric acid concentration was 35 g/L, that the manganese/sulfuric acid concentration ratio was 0.20, that the feed manganese concentration was 25 g/L, that the pH at the time of the neutralization treatment was 4.2, and that after filtration for separation and drying, the electrolytic manganese dioxide was subjected to a sieve with an opening of 32 μm. Of the obtained electrolytic manganese dioxide, the results of evaluation of the apparent density, the mode particle size, etc. are shown in Table 1.

Comparative Example 3

Electrolysis was conducted in the same manner as in Example 3 except that the sulfuric acid concentration was 60 g/L, that the manganese/sulfuric acid concentration ratio was 0.31, that the feed manganese concentration was 50 g/L, and that the pH at the time of the neutralization treatment was 4.2. Of the obtained electrolytic manganese dioxide, the results of evaluation of the apparent density, the mode particle size, etc. are shown in Table 1.

It is found from Table 1 that by producing electrolytic manganese dioxide at a sulfuric acid concentration in each of Examples 1 to 7, the obtained electrolytic manganese dioxide has a higher apparent density, a larger mode particle size, a smaller micropore volume and a higher alkali potential as compared with Comparative Examples 1 to 3. Further, the electrolytic manganese dioxide in each of Examples 1 to 7 achieves a higher cathode mixture density and a higher alkali potential as compared with Comparative Examples 1 to 3, whereby excellent discharge characteristics particularly low rate and middle rate characteristics can be expected.

The entire disclosure of Japanese Patent Application No. 2018-160407 filed on Aug. 29, 2018 including specification, claims, drawings and summary is incorporated herein by reference in its entirety.

INDUSTRIAL APPLICABILITY

Since the electrolytic manganese dioxide of the present invention has specific apparent density and mode particle size, it is useful as a cathode active material for manganese dry cells, in particular alkaline manganese dry cells, excellent in discharge characteristics particularly low rate and middle rate discharge characteristics.

The invention claimed is:

1. Electrolytic manganese dioxide particles, the apparent density of the electrolytic manganese dioxide particles being at least 4.0 g/cm$^3$ and at most 4.3 g/cm$^3$, and the mode particle size of the electrolytic manganese dioxide particles being at least 30 μm and at most 100 μm.

2. The electrolytic manganese dioxide particles according to claim 1, wherein a micropore volume of the electrolytic manganese dioxide particles is at most 0.009 mL/g.

3. The electrolytic manganese dioxide particles according to claim 1, wherein the maximum particle size is at most 500 μm.

4. The electrolytic manganese dioxide particles according to claim 1, wherein the alkali potential is at least 280 mV and at most 350 mV.

5. The electrolytic manganese dioxide particles according to claim 1, wherein the electrolytic manganese dioxide particles comprise a sulfate group (SO$_4$), the sulfate group content being at most 1.5 wt %.

6. The electrolytic manganese dioxide particles according to claim 1, wherein the electrolytic manganese dioxide particles comprise sodium, the sodium content being at least 10 wt ppm and at most 5,000 wt ppm.

7. A method for producing the electrolytic manganese dioxide particles as defined in claim 1, wherein the sulfuric acid concentration in the electrolyte at the time of electrolysis is at least 42 g/L and at most 50 g/L, the sulfuric acid concentration from the initiation of electrolysis to the completion of electrolysis is constant, the manganese/sulfuric acid concentration ratio in the electrolyte at the time of electrolysis is at least 0.1 and at most 0.6, and the electrolysis current density is at least 0.1 A/dm$^2$ and at most 0.5 A/dm$^2$.

8. A cathode active material for a dry cell, comprising the electrolytic manganese dioxide particles as defined in claim 1.

9. A dry cell comprising the cathode active material for a dry cell as defined in claim 8.

* * * * *